Sept. 15, 1931.  A. A. HOLBECK  1,823,604
METHOD AND MEANS FOR PREPARING METAL FOR POURING
Filed Feb. 15, 1929
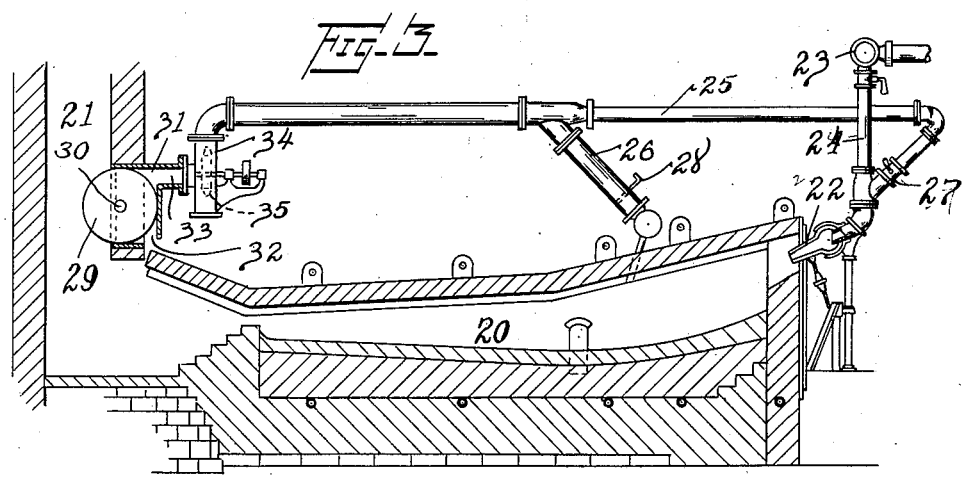
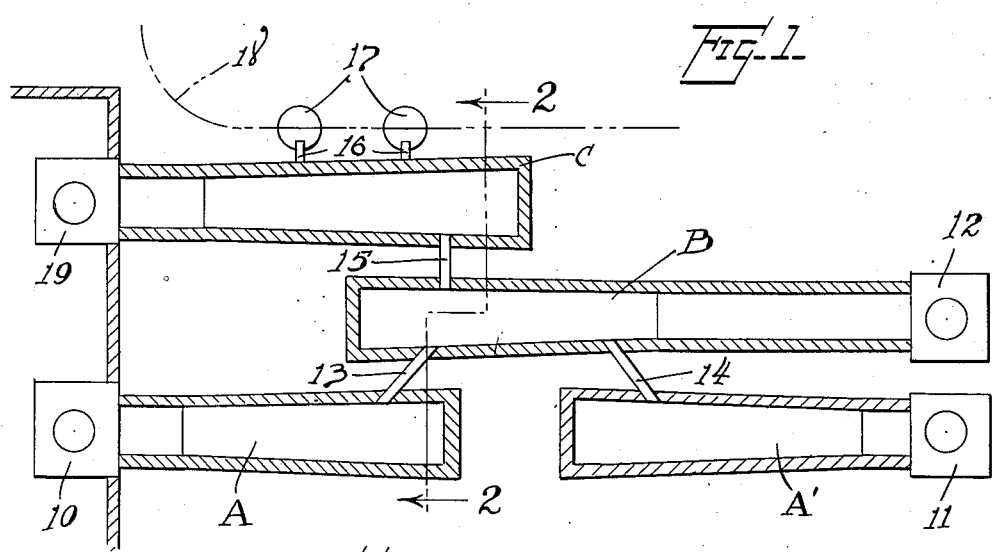
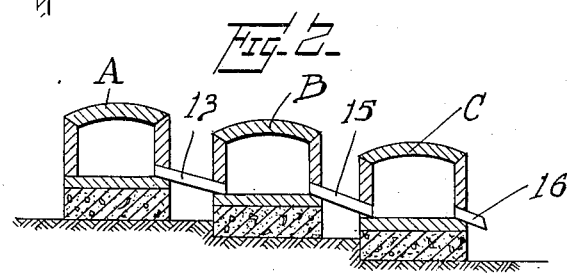
Inventor
Austin A. Holbeck
Knox Hudson & Kent
Attys.

Patented Sept. 15, 1931

1,823,604

UNITED STATES PATENT OFFICE

AUSTIN A. HOLBECK, OF LAKEWOOD, OHIO

METHOD AND MEANS FOR PREPARING METAL FOR POURING

Application filed February 15, 1929. Serial No. 340,032.

This invention relates to a method and means for preparing metal for pouring, and is intended primarily for use as part of a system of producing malleable iron castings in a continuous melting, pouring, molding and annealing plant.

Malleable iron casting plants at the present time usually employ what are known as air furnaces for melting the metal and bringing it to the high temperature essential for the successful pouring of the iron, it being necessary to keep the metal in a highly fluid state for about twenty minutes after it leaves the furnace. It is the practice in using such a furnace to charge it with pig iron and scrap in such proportion as to make a predetermined analysis. This charge is then melted, the slag skimmed off, and the iron further heated to bring it to the desired temperature for pouring. The molten iron is then drawn off, one ladle full at a time, and poured in the molds. The furnace is then ready for another charge. Pouring is necessarily interrupted during the melting and superheating operations and these operations require considerable time with the result that two heats per ten hour day are all that can be taken. Little has been done toward using a plurality of such furnaces alternately, one reason therefor being that the conveyor apparatus must then be similarly multiplied and complicated. Melting in cupolas and refining small charges taken therefrom in electric furnaces has been employed to some small extent, but this method is open to the objections that it is difficult to produce good malleable iron in a cupola and that the electric furnace is expensive on account of maintenance as well as on account of the high consumption of electric current.

The present invention therefore has for one of its objects the provision of a method of preparing good quality malleable iron for continuous pouring, and delivering the same to ladles at one given point, without incurring a heavy expense for installation, operation and maintenance.

A further object is the provision of a method of this character in which the temperature of the iron when poured shall be relatively high.

Other objects and features of novelty will appear as I proceed with the description of that embodiment of the invention which, for the purposes of the present application, I have illustrated in the accompanying drawings, in which Figure 1 is a horizontal sectional view, largely diagrammatic, illustrating an arrangement of furnaces which may be employed in carrying out the invention.

Fig. 2 is a vertical cross sectional diagrammatic view corresponding to the line 2—2 of Fig. 1; and Fig. 3 is a longitudinal vertical sectional view on a larger scale of an air furnace such as may be advantageously employed.

In the drawings, the furnaces A and A' are melting furnaces, arranged upon the same level. Two such furnaces will generally be sufficient, but the invention contemplates the use of three or more at that level if necessary. 10 and 11 are stacks serving the furnaces A and A' respectively. B is an intermediate heating furnace having a stack 12, the furnace B being arranged at a level sufficiently lower than the furnaces A and A' to enable the full charge of either of the last named furnaces to be tapped into the furnace B. A conductor for tapping the molten metal from furnace A to furnace B is indicated at 13. A similar conductor connecting the furnaces A' and B is indicated at 14. Suitable means (not shown) may be provided for preventing flow through these conductors except when desired.

At a still lower level I provide another furnace C, which I term a heating and holding furnace, connected with the furnace B by a conductor 15 similar to the conductors 13 and 14, and likewise provide with some suitable cut-off means, not shown. From the opposite side of the furnace extends one or two taps 16, from which may be filled ladles diagrammatically indicated at 17, these ladles being preferably supported to travel upon a conveyor or track, a portion of which is indicated by the broken line 18. A stack 19 serves the furnace C.

The furnaces B and C are what are known in the industry as air furnaces, and the furnaces A and A' are preferably, although not necessarily, of the same character. Air furnaces differ somewhat as to particulars of design, and I do not desire to be limited to any specific details in this regard. However, for the sake of a complete disclosure of the invention, I have illustrated in Fig. 3 one style of air furnace that is suitable for the purpose, and that is more fully shown and described in my Patent No. 1,590,373, issued June 29, 1926. In Fig. 3 I have shown a hearth 20 upon which the iron to be melted is placed. Leading from one end of the furnace is a stack 21 through which the waste heat is conducted away. In this instance the fuel consists of powdered coal which is delivered into the opposite end of the furnace by a nozzle 22. The powdered fuel is circulated through a distributing line 23, which may be connected to the nozzles of the various furnaces by means of valved pipes 24, one of which is shown leading from the distributing line 23 to the nozzle 22.

The pulverized fuel is moved along the line 23 and through the pipe 24 to the nozzle 22 by means of a circulating stream of air, but in order that the air and pulverized fuel may be delivered to the furnace in the right proportions, a secondary air line 25 is connected to the pipe 24 just above the nozzle 22. By means of a connection 26, the air may be introduced also into the top of the furnace. The delivery of the secondary air, whether to the burner or directly to the top of the furnace, is controllable through valves indicated at 27 and 28. The air which is supplied through the pipe 25 is heated by the waste gases which pass up the stack 21.

A considerable number of parallel metal disks 29 are mounted on a shaft 30 rotated in any suitable manner, these disks projecting partly into stack 11 and partly into a chamber 31, which is seated in the wall of the stack. The lower part of the chamber has an air inlet opening 32, and the top of the chamber has an outlet opening 33 so that the air in passing through this chamber from 32 to 33 is compelled to pass along or between the disks 29, and thus to absorb heat therefrom. The outlet 33 is connected to the casing 34 of a fan or blower 35, by means of which the current of air is set in motion.

In carrying out the method of the present invention with the apparatus above described, the furnaces A and A' are filled with pig iron and scrap to be melted. One of these furnaces, A for example, is then heated for a length of time sufficient to melt all of the metal therein. The slag on the top of this metal is then skimmed off. This charge of metal is then tapped into furnace B through conductor 13, and a new supply of pig iron and scrap is placed in furnace A, and the heating of this second charge begun. In the meantime the metal in furnace A' is also being heated. The molten metal in furnace B is then subjected to a greater heat in order to bring up the temperature of the metal to a point considerably in excess of melting temperature, which may or may not be the temperature desired for pouring. The final skimming operation to remove any additional slag is next performed, and the metal in furnace B is then tested for analysis, and if any elements are low they are added in the required amounts. Next the contents of furnace B are tapped off into furnace C through the conductor 15. In furnace C the metal may be further heated to bring it up to pouring heat if that heat had not been already attained in furnace B, and in any event to keep the metal at pouring heat. Furnace B is then refilled by tapping into it the charge of melted metal in furnace A', and the latter furnace again filled with pig iron and scrap and the heating of its charge begun. This second charge in furnace B is treated as before. Furnaces B and C are now filled with molten metal, furnace A with partially melted metal and furnace A' with newly supplied unmelted metal.

The pouring operation may now be begun. A ladle 17 is brought into position beneath one of the taps 16, is filled and moved off upon the track or conveyor 18, and its contents poured into the waiting molds. The ladle may have a capacity of somewhere in the neighborhood of ten percent of the furnace capacity. If the contents of furnace B are ready the operator may tap therefrom into furnace C an amount of metal equal to that drawn off in the ladle. Otherwise this latter operation may be delayed somewhat and the tapping into furnace C performed any time before the latter furnace is emptied. It is the aim of the invention to maintain continuously in the furnace C a charge of metal at a temperature suitable for pouring, and to keep furnace C as nearly filled as possible. As soon as this process of filling C from B exhausts the metal in B, a new full charge is tapped into furnace B from furnace A. The various steps described are repeated, and all of the furnaces are kept active all of the time, the system being so designed that a sufficient supply of metal heated to pouring temperature may be provided at all times in the holding furnace C to supply a charge for a ladle at regularly recurring intervals of say twenty minutes' duration. While the apparatus and method as above described are preferred, the invention in its broader aspects contemplates the omission of the last furnace C and the filling of the ladles directly from the furnace B, the latter receiving charges of melted iron alternately from furnaces A and A'. This arrangement however does not provide a fully continuous system, since some little time must elapse after a new charge is tapped into furnace B before the metal in that furnace can be brought to a high heat, the additional slag removed, the metal tested and the necessary ingredients, if any, added.

Other departures from the details herein disclosed may be made without departing from the spirit of my invention, and I desire it to be understood that the detailed disclosure herein is primarily for the purpose of fully illustrating the invention and is not to be considered as a limitation upon the scope thereof.

Having thus described my invention, I claim:

1. A method of preparing metal for continuous pouring in a casting system, comprising melting metal in a plurality of furnaces, tapping off melted metal from one of said furnaces into an intermediate heating furnace, refilling said first named furnace with metal to be melted, bringing the metal in said intermediate furnace up to a predetermined heat above that of the melting furnaces, tapping off the metal from said intermediate furnace into a heating and holding furnace, refilling said intermediate furnace by tapping off metal from another of said melting furnaces, tapping off metal from said holding furnace a portion at a time and replacing said metal by metal tapped off from said intermediate furnace, continuing this operation until said intermediate furnace is emptied, refilling said intermediate furnace by tapping metal thereinto from another of said melting furnaces, refilling said melting furnace with metal to be melted, and proceeding as before.

2. A method of preparing metal for continuous pouring in a casting system comprising melting metal in a plurality of furnaces, tapping off melted metal from one of said furnaces into an intermediate heating furnace, refilling said first named furnace with metal to be melted, bringing the metal in said intermediate furnace up to a predetermined heat above that of the melting furnaces, supplying any ingredients necessary to bring the metal in said intermediate furnace to the desired analysis, tapping off the metal from said intermediate furnace into a heating and holding furnace, refilling said intermediate furnace by tapping off metal from another of said melting furnaces, supplying any ingredients necessary to bring the metal in the intermediate furnace up to the desired analysis, tapping off metal from said holding furnace a portion at a time and replacing said metal by metal tapped off from said intermediate furnace, continuing this operation until said intermediate furnace is emptied, refilling said intermediate furnace by tapping metal thereinto from another of said melting furnaces, refilling said latter furnace with metal to be melted, and proceeding as before.

In testimony whereof, I hereunto affix my signature.

AUSTIN A. HOLBECK.